United States Patent [19]

Brecht et al.

[11] 3,925,438

[45] Dec. 9, 1975

[54] FLUORINATED URETHANE-N-SULFONIC ACID ESTERS

[75] Inventors: Heinz Brecht, Bad Soden, Taunus; Dieter Hoffmann, Bobingen, both of Germany

[73] Assignee: Hoechst Aktiengesellschaft, Frankfurt am Main, Germany

[22] Filed: July 2, 1974

[21] Appl. No.: 485,242

[30] Foreign Application Priority Data

July 6, 1973 Germany............................ 2334346

[52] U.S. Cl........... 260/456 A; 260/468 E; 252/8.7; 252/353
[51] Int. Cl.$^2$......................................... C07C 143/00
[58] Field of Search.................... 260/456 A, 456 R

[56] References Cited

UNITED STATES PATENTS 3,839,417  10/1974  Waldmann........................ 260/458

OTHER PUBLICATIONS

Blochl, Chem. Abstract, 75, 37843b (1971).

*Primary Examiner*—James O. Thomas, Jr.
*Assistant Examiner*—Nicky Chan
*Attorney, Agent, or Firm*—Connolly and Hutz

[57] ABSTRACT

Polyglycol esters of fluoroalkylurethane-N-sulfonic acids are obtained by reacting fluoroalkanols or oxethylates thereof with chlorosulfonyl isocyanate and acylating with the so-obtained sulfochloride a polyglycol. The products are thermo-labile emulsifiers.

9 Claims, No Drawings

FLUORINATED URETHANE-N-SULFONIC ACID ESTERS

The present invention relates to fluorinated urethane-N-sulfonic acid esters.

Object of the invention are compounds of the general formula I

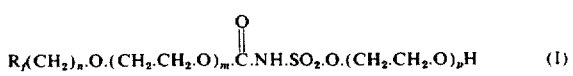

in which $R_f$ stands for a linear perfluoroalkyl radical of 6 to 10, preferably 6 or 7 carbon atoms, $n$ is a number from 1 to 2, $m$ is a number from 0 to 4 and $p$ is a number from about 4 to about 50, preferably about 10 to about 20.

Further object of the invention is the use of these compounds as thermolabile emulsifiers.

Starting materials for the products of the invention are known fluorinated alcohols of the general formula
$$R_f(CH_2)_nOH \quad (II)$$
in which $R_f$ and n are defined as above (cf. U.S. patent specifications Nos. 2,666,797 and 3,171,861; German Offenlegungsschriften Nos. 2,028,459 and 1,468,253).

The fluorinated alcohols of the formula II are reacted in known manner with varying amounts of ethylene oxide to yield compounds of the formula III
$$R_f(CH_2)_n.O.(CH_2.CH_2.O)_m H \quad (III)$$
in which $R_f$, $n$ and $m$ are defined as above.

The fluorinated alcohols of the formula II or their derivatives of the formula III are reacted with chlorosulfonyl-isocyanate of the formula IV
$$O = C = N - SO_2Cl \quad (IV)$$
according to a known process (cf. R. Graf, Angew. Chemie 80, 179 (1968)) according to the following equation, in solution, for example in methylene chloride, at 0° – 5°C and optionally under an inert gas atmosphere, such as, for example, nitrogen, to yield urethane-N-sulfonic acid chlorides of the formula V

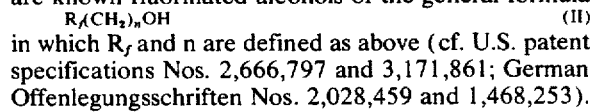

The sulfochlorides of the formula (V) can be isolated by eliminating the solvent at a temperature below 30°C, preferably about 10°C. However, it is more advantageous to directly use the solution of the sulfochlorides for reacting it to yield the products of the invention according to the following equation by introducing it dropwise in a solution of polyethylene glycol (hereinafter called:PEG or polyglycol followed by a number which indicates the medium molar weight) of the formula VI, for example, in methylene chloride at about 20°C:

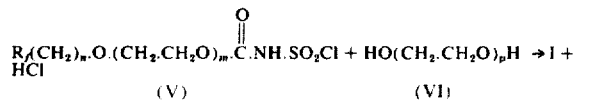

Secondary products thereby formed in slight amounts are the compounds of the formula VII

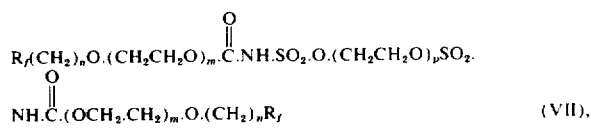

However, their formation can mostly be suppressed by using an excess of polyglycol (VI). The excess polyglycol can be eliminated by washing, for example, with sodium hydroxide solution. However, for the use of those substances as emulsifiers this operation is not necessary.

The hydrogen chloride set free by this reaction is advantageously separated, preferably it is withdrawn under reduced pressure under stirring the reaction mixture while simultaneously eliminating the solvent. However, a temperature of 30°C must not be exceeded.

Depending on the chain length of the fluoroalkyl group and the meaning given to $n$, $m$ and $p$, the products are obtained as high-viscous, colorless to slightly yellow masses or as white powder.

The surface-tension values of the substances of the invention in aqueous solution (measured according to the ring removal method according to Du Nouy, J. gen. Physiol. 7 (1925), 625) confirm their surface-active character.

However, the outstanding property of the substances of the invention is their decomposition in aqueous solution within a few minutes at a temperature ranging from 90° – 150°C, preferably in acid solution (pH<4) or in alkaline solution (pH>10) accompanied by the simultaneous loss of the emulsifying effect.

Due to this property the substances of the invention can be used for such technical processes in which the presence of an emulsifier is only temporarily necessary, but then undesirable and disadvantageous, for example, in polymerizations, in the finishing of fibers and textile material, especially water-repellant finishes.

The primary decomposition of the substances of the invention occurs at the S—N—bond

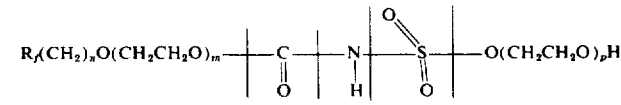

which leads at first to the formation of urethanes which no longer show any surface-active character. However, the decomposition continues, and leads to fractions, for example, in acid solution to high-fluorinated alcohols or their derivatives, carbon dioxide, the ammonium ion and sulfate ion and polyglycols.

To determine the rate of the decomposition reaction, primarily the surface-tension values of the substances of the invention depending on the concentration in water/polyglycol 400 (1 : 1) were determined (cf. following table 2). In the range of the critical micell formation concentration a heat treatment at 50°C, 70°C, 100°C, 120°C, 140°C and 150°C was effected each time in the course of 30 minutes. After cooling the surface-tension was determined once more (cf. table 3).

In order to avoid the decomposition of the polyglycol 400 in the water/polyglycol 400 mixture in the thermostability tests, 0.5 % of phenothiazine were added to the polyglycol 400.

The same measurements were repeated at pH 3. The increased surface-tension values at 120°, 140° and 150°C allow the conclusion that the surface-active substance is decomposed under these conditions.

For this reason, the substances of the invention can be labelled as thermolabile surfactants. This property is advantageous, for example, in the preparation of emulsions for textile finishing. After the application of the emulsion to the textile material a reemulsification of the active substance in the after-treatment with water or washing liquors is avoided because of the decomposition of the emulsifier in the following drying and curing operation. Especially, these properties are important in the water-repellent impregnation of textile fabrics, for example, with silicones (cf. example 7).

The following examples illustrate the invention. Parts and percentages are by weight unless otherwise stated.

EXAMPLE 1

104 g of 1.1.2.2-tetrahydroperfluorooctanol (286 mmols) were mixed with 200 ml of dried dichloromethane in a 500 ml flask into which 40 g of chlorosulfonylisocyanate (283 mmols) dissolved in 100 ml of dried dichloromethane were added dropwise while stirring during one hour at 5° – 10°C under nitrogen. Stirring was continued for 2 hours and the solvent was removed. 147 g of 1.1.2.2-tetrahydroperfluorooctyl-urethane-N-sulfo-chloride of the formula $C_6F_{13}.CH_2.CH_2.O.CO.NH.SO_2Cl$ (acid number = 217; calculated: 222) were obtained which served as starting material for three reactions with each equivalent amounts of polyglycol 200, 1000 and 2000.

30 g of 1.1.2.2-tetrahydroperfluorooctyl-urethane-N-sulfo-chloride of the formula $C_6F_{13}.CH_2.CH_2.O.CO.NH.SO_2Cl$ (54 mmols) and 50 ml of dried dichloromethane were placed in a 250 ml flask wherein 109 g of polyglycol 2000 (54.5 mmols) dissolved in 50 ml of dichloromethane were introduced in 1 hour at room temperature while stirring. The temperature dropped to +5°C and rose again to room temperature within a 2 hours' after-stirring. The residual hydrogen chloride formed in the reaction was removed together with the solvent. A wax-like product was obtained in quantitative yield which melted at 47°C.

| Found: | C = 48.1 % | H = 8.1 % |
|---|---|---|
| Calculated: | C = 47.5 % | H = 7.4 % |

In a similar manner each time 30 g of the sulfo-chloride were reacted with 54.5 g of polyglycol 1000 or 10.9 g of polyglycol 200. With polyglycol 1,000 a wax-like mass was obtained which melted at 35°C. Polyglycol 200 yielded an oil which showed the following data obtained by elementary analysis:

| Found: | C = 28.8 % | H = 2.4 % |
|---|---|---|
| Calculated: | C = 29.9 % | H = 3.2 % |

EXAMPLE 2

250 g of 1.1-dihydroperfluorooctanol (= 625 mmols) and 400 ml of dried dichloromethane were introduced in a 1 l-flask at 10°C under $N_2$ while stirring. Within an hour 88.5 g of chlorosulfonyl-isocyanate (= 625 mmols) dissolved in 100 ml of dichloromethane were added dropwise, the mixture was stirred for 3 hours at room temperature and the solvent was removed. 305 g of 1.1-dihydroperfluorooctyl-urethane-N-sulfochloride of the formula $C_7F_{15}.CH_2.O.CO.NH.SO_2Cl$ (acid number: 217; calculated: 213) were obtained and used for 3 reactions with each time equivalent amounts of polyglycol 200, 1000 and 2000.

Each 30 g of 1.1-dihydroperfluorooctyl-urethane-N-sulfo-chloride of the formula $C_7F_{15}.CH_2.O.CO.NH.SO_2Cl$ (55.4 mmols) and 150 ml of dried dichloromethane were placed in a 250 ml flask and 113 g of polyglycol 2000 (56.4 mmols), 57 g of polyglycol 1000 (57 mmols) or 11 g of polyglycol 200 (57 mmols) were introduced portionwise within 1 hour at room temperature. The temperature fell to +5°C and rose again to room temperature while stirring for 3 hours. The hydrogen chloride was removed together with the solvent in vacuo at room temperature.

Colorless products were obtained in nearly quantitative yield with a melting point of 47°C or dropping points of 42°C and 23°C, respectively.

EXAMPLE 3

50.0 g of chlorosulfonyl-isocyanate (355 mmols) dissolved in dry dichloromethane, were added dropwise at 10°C under inert gas to 200 g of 1.1.2.2-tetrahydroperfluorododecanol (355 mmols), dissolved in 650 ml of dried dichloromethane and this solution was stirred for 3 hours at room temperature. Then the solvent was removed.

208 g of a product were obtained which had an acid number of 158 (calculated 159). 40 g of the ester so obtained of the formula $C_{10}F_{21}.CH_2.CH_2.O.CO.NH.SO_2Cl$ (56 mmols) and 50 ml of dried dichloromethane were placed in a 250 ml flask and 11.3 g of polyglycol 200 (56 mmols) were added dropwise while stirring. The temperature shortly sank to +5°C. After removing the solvent and the hydrogen chloride at about 20°C, there remained 47 g (95 % of the theory) of a colorless product which melted at 56°C.

EXAMPLE 4

150 g of 1.1.2.2-tetrahydroperfluorooctyl-glycolether (375 mmols) and 150 ml of dried dichloromethane were placed in a 500 ml flask and 52 g of chlorosulfonyl-isocyanate (368 mmols) dissolved in 50 ml of dried dichloromethane were added dropwise at 10°C within an hour. After eliminating the solvent 178 g of colorless product were obtained (acid number: 203; calculated: 204). The sulfochloride of the formula $C_6F_{13}.CH_2.CH_2.O.(CH_2.CH_2.O).CO.NH.SO_2Cl$ was used for 3 reactions with equivalent amounts of polyglycol 200, 1000 and 2000.

Solutions of 14.6 g of polyglycol 200, 73 g of polyglycol 1000 or 146 g of polyglycol 2000 (each time 73 mmols) were added dropwise to the above sulfochloride of the formula $C_6F_{13}.CH_2.CH_2.O.(CH_2.CH_2.O).CO.NH.SO_2Cl$ (72.8 mmols) dissolved in 100 ml of dried dichloromethane. After a 3 hours' reaction period the solvent and the residual amounts of hydrogen chloride were removed. Colorless products were obtained which melted at 174°C or had dropping points of 19°C and 29°C, respectively.

EXAMPLE 5

80 g of 1.1.2.2-tetrahydroperfluorooctanyl-triglycolether (161 mmols) and 100 ml of dried dichloromethane were introduced in a 250 ml flask and stirred at +10°C under nitrogen. Within half an hour 23 g of chlorosulfonyl-isocyanate (162 mmols) in 50 ml of dried dichloromethane were added dropwise. After removing the solvents 103 g of product were obtained (acid number: 180; calculated: 175.9).6.3 g. of polyglycol 200, 31.5 g of polyglycol 1000 or 62.8 g of polyglycol 2000 were introduced in each 20 g of $C_6F_{13}.CH_2.CH_2.O.(CH_2.CH_2.O)_3.CO.NH.SO_2Cl$ (31.4 mmols), dissolved in 50 ml of dried dichloromethane. After 3 hours' stirring at 20°C and pumping off the solvent and the hydrogen chloride wax-like masses were obtained which had dropping points of 18°C, 20°C and 28°C, respectively.

EXAMPLE 6

46 g of 1.1.2.2-tetrahydroperfluorodecanol-tetra glycolether (65 mmols) were mixed with 50 ml of dried dichloromethane in a 250 ml flask and 10.2 g of chlorosulfonyl-iso-cyanate (65 mmols) in 50 ml of dried dichloromethane were added dropwise within 1 hour at 5° – 10°C while stirring. Stirring was continued for 2 hours and the solvent was removed. 52 g of product were obtained (acid number: 146.5; calculated: 140.6).

The ester of the formula $C_8F_{17}.CH_2.CH_2.O.(CH_2.CH_2O)_4.CO.NH.SO_2Cl$ was reacted with equivalent amounts of the polyglycol 200, 1000 and 2000.

Each 12 g of the compound $C_8F_{17}.CH_2.CH_2.O.(CH_2.CH_2.O)_4CO.NH.SO_2Cl$ (15.3 mmols), dissolved in 50 ml of dried dichloromethane, were reacted with 3.7 g of polyglycol 200, 18.5 g of polyglycol 1000 or 37 g of polyglycol 2000 at 20°C. The hydrogen chloride thereby formed was removed together with the solvent. Wax-like masses were obtained in nearly quantitative yields which had dropping points of 27°C and 45°C and a melting point of 60°C, respectively.

EXAMPLE 7

A commercial silicone oil (viscosity: 400 cP) was used to prepare silicone oil emulsions. To carry out the basic tests primarily 1 to 8 parts of the fluorinated compound I were mixed with 80 parts of silicone in a 250 ml beaker and slightly dissolved by heating, if necessary. The mixer was then treated with the impeller and 100 parts of distilled water was gradually added.

The non fluorinated emulsifiers used for comparison tests did not yield any stable emulsions.

By means of the silicone emulsions of the invention of moderate to very good stability good and smooth finishing baths could be prepared.

The finishing baths had been prepared by means of 60 g/l of the silicone oil emulsions prepared according to the methods described above and of commercial melamine formaldehyde resin, magnesium chloride and zirconyl chloride. Their aspect and stability were judged immediately after the preparation and after standing for 24 hours (cf. table 4). Using this liquor a fabric of polyethylene glycol and cotton fibers (50 : 50) was padded with a squeezing effect of about 80 %. The fabric was dried at 110°C for 10 minutes and cured at 155°C for 5 minutes. The water-repellent degree of the fabric was determined according to the AATCC-test 22-1952. (cf. table 5).

Table 1

Surface tension values (dyn/cm) of the compound I depending on the concentration (g/l) in $H_2O$

| $R_f$ | n | m | p | 5,0 | concentration (g/l) 1,0 | 0,3 | 0,1 |
|---|---|---|---|---|---|---|---|
| $C_6F_{13}$ | 2 | 0 | 4,5 | 17,5 | 18,5 | 19,5 | 30,0 |
| $C_6F_{13}$ | 2 | 0 | 23 | 21,0 | 25,0 | 31,5 | 38,0 |
| $C_6F_{13}$ | 2 | 0 | 46 | 22,0 | 27,5 | 32,5 | 44,0 |
| $C_7F_{15}$ | 1 | 0 | 4,5 | 20,5 | 22,0 | 25,0 | 30,5 |
| $C_7F_{15}$ | 1 | 0 | 23 | 21,5 | 29,0 | 37,5 | 48,0 |
| $C_7F_{15}$ | 1 | 0 | 46 | 24,5 | 32,5 | 43,0 | 49,0 |
| $C_{10}F_{21}$ | 2 | 0 | 4,5 | 29,5 | 30,5 | 31,0 | 31,5 |
| $C_6F_{13}$ | 2 | 1 | 4,5 | 17,5 | 18,5 | 19,0 | 20,0 |
| $C_6F_{13}$ | 2 | 1 | 23 | 18,0 | 20,0 | 22,5 | 28,0 |
| $C_6F_{13}$ | 2 | 1 | 46 | 19,5 | 20,0 | 23,0 | 29,0 |
| $C_6F_{13}$ | 2 | 3 | 4,5 | 18,5 | 19,0 | 19,5 | 22,0 |
| $C_6F_{13}$ | 2 | 3 | 23 | 18,5 | 19,5 | 20,0 | 28,5 |
| $C_6F_{13}$ | 2 | 3 | 46 | 19,0 | 20,0 | 22,0 | 32,5 |
| $C_8F_{17}$ | 2 | 4 | 4,5 | 19,0 | 21,0 | 22,5 | 30,0 |
| $C_8F_{17}$ | 2 | 4 | 23 | 20,0 | 21,0 | 22,5 | 31,0 |
| $C_8F_{17}$ | 2 | 4 | 46 | 20,5 | 22,0 | 24,5 | 33,5 |

Table 2

Surface-tension depending on the concentration (dyn/cm) / (g/l) in water/polyglycol 400 = 50 : 50 of the compounds I

| $R_f$ | n | m | p | 5,0 | concentration (g/l) in PEG 400/$H_2O$ = 50:50 1,0 | 0,3 | 0,1 | 0,03 |
|---|---|---|---|---|---|---|---|---|
| $C_6F_{13}$ | 2 | 0 | 4,5 | 19,0 | 22,0 | 25,0 | 38,5 | 47,5 |
| $C_6F_{13}$ | 2 | 0 | 46 | 29,0 | 40,5 | 48,5 | 51,5 | 52,0 |
| $C_6F_{13}$ | 2 | 3 | 4,5 | 17,5 | 19,5 | 21,5 | 23,5 | 34,5 |
| $C_6F_{13}$ | 2 | 3 | 23 | 19,0 | 24,5 | 32,5 | 38,0 | 49,0 |

Table 3

Surface-tension values (dyn/cm) of I in water/polyglycol 400 = 50 : 50 after a 30 minutes' heat treatment

| $R_f$ | n | m | p | g/l | surface-tension dyn/cm after heat treatment at °C 20 | 100 | 120 | 140 | 150 |
|---|---|---|---|---|---|---|---|---|---|
| $C_6F_{13}$ | 2 | 0 | 4,5 | 0,3 | 25,0 | 26,0 | 31,0 | 40,5 | 44,5 |
| $C_6F_{13}$ | 2 | 0 | 46 | 3,0 | 32,5 | 34,0 | 35,5 | 38,0 | 40,5 |
| $C_6F_{13}$ | 2 | 3 | 4,5 | 0,1 | 24,0 | 25,5 | 27,0 | 35,0 | 38,0 |
| $C_6F_{13}$ | 2 | 3 | 23 | 1,0 | 24,5 | 25,5 | 28,0 | 33,5 | 35,5 |

TABLE 4

Preparation and stability of silicone emulsions $$R_f(CH_2)_n.O.(CH_2CH_2O)_m\overset{O}{\underset{\|}{C}}.NH.SO_2.O.(CH_2CH_2O)_pH$$

| $R_f$ | n | m | p | amount of emulsifier (g) | Stability of emulsion 24 hours |
|---|---|---|---|---|---|
| $C_{12}H_{25}$- | 0 | 0 | 4,5* | 8 | no emulsion |
| $C_{12}H_{25}$- | 0 | 0 | 23* | 8 | no emulsion |
| $C_{12}H_{25}$- | 0 | 0 | 45* | 8 | no emulsion |
| $C_{10}F_{21}$- | 2 | 0 | 4,5 | 8/4 | good/moderate |
| $C_{10}F_{21}$- | 2 | 0 | 23 | 8/4 | good/moderate |
| $C_{10}F_{21}$- | 2 | 0 | 45 | 8/4 | good/moderate |
| $C_7F_{15}$- | 1 | 0 | 4,5 | 8/4 | good/moderate |
| $C_7F_{15}$- | 1 | 0 | 23 | 8/4/3/2 | good/moderate/moderate/bad |
| $C_7F_{15}$- | 1 | 0 | 45 | 8 | good |
| $C_6F_{13}$- | 2 | 0 | 4,5 | 8/2 | good/moderate |
| $C_6F_{13}$- | 2 | 0 | 23 | 8/2 | good/moderate-good |
| $C_6F_{13}$- | 2 | 0 | 45 | 8/2 | good/good |
| $C_6F_{13}$- | 2 | 1 | 4,5 | 8/2/1 | very good/good/moderate-good |
| $C_6F_{13}$- | 2 | 1 | 23 | 8/ /1 | very good/ — /good |
| $C_6F_{13}$- | 2 | 1 | 45 | 8/2/1 | very good/good/good |
| $C_6F_{13}$- | 2 | 3 | 4,5 | 8/1/0.5 | very good/very good/good |
| $C_6F_{13}$- | 2 | 3 | 23 | 8/1 | very good/good/good |
| $C_6F_{13}$- | 2 | 3 | 45 | 8/1/0.5 | very good/good/moderate-bad |

| Prescription | 80 g | silicone oil |
|---|---|---|
| | x g | emulsifier |
| | 100 g | wholly demineralized water |

*prior art

We claim:
1. A compound of the formula

$$R_f-(CH_2)_n-O-(CH_2CH_2O)_m-CO-NH-SO_2-O-(CH_2CH_2O)_pH \quad (I)$$

in which
$R_f$ is n-perfluoroalkyl of 6 to 10 carbon atoms,
$n$ is a number of 1 to 2,
$m$ is a number of zero to 4 and
$p$ is a number of about 4 to about 50.

2. A compound as defined in claim 1, wherein $R_f$ has 6 or 7 carbon atoms.

3. A compound as defined in claim 1, wherein $p$ is a number of about 10 to about 20.

4. A compound as defined in claim 1, wherein $R_f$ is n-$C_6F_{13}$, $n$ is 2, $m$ is a number of 1 to 3 and $p$ is a number of about 4 to about 25.

5. The compound as defined in claim 4, wherein $m$ is 3 and $p$ is about 4.5.

6. The compound as defined in claim 4, wherein $m$ is 3 and $p$ is about 23.

7. The compound as defined in claim 4, wherein $m$ is 1 and $p$ is about 45.

8. The compound as defined in claim 4, wherein $m$ is 1 and $p$ is about 23.

9. The compound as defined in claim 4, wherein $m$ is 1 and $p$ is about 4.5.

* * * * *